(12) United States Patent
Parra Cebrian

(10) Patent No.: US 11,882,801 B2
(45) Date of Patent: Jan. 30, 2024

(54) TANK HOUSING A VERTICAL FARM

(71) Applicant: PARCITANK, S.A., Villarrobledo (ES)

(72) Inventor: Vicente Parra Cebrian, Villarrobledo (ES)

(73) Assignee: PARCITANK, S.A.

( * ) Notice: Subject to any disclaimer, the term of this patent is extended or adjusted under 35 U.S.C. 154(b) by 774 days.

(21) Appl. No.: 16/321,501

(22) PCT Filed: Aug. 11, 2016

(86) PCT No.: PCT/ES2016/070602
§ 371 (c)(1),
(2) Date: Jan. 29, 2019

(87) PCT Pub. No.: WO2018/029386
PCT Pub. Date: Feb. 15, 2018

(65) Prior Publication Data
US 2021/0282343 A1    Sep. 16, 2021

(51) Int. Cl.
*A01G 31/02*    (2006.01)
*A01G 31/06*    (2006.01)
(Continued)

(52) U.S. Cl.
CPC .............. *A01G 31/02* (2013.01); *A01G 7/045* (2013.01); *A01G 9/143* (2013.01); *A01G 9/26* (2013.01); *A01G 31/06* (2013.01)

(58) Field of Classification Search
CPC ........ A01G 31/02; A01G 31/06; A01G 31/00; A01G 7/045; A01G 9/143; A01G 9/26; A01G 2031/006
See application file for complete search history.

(56) References Cited

U.S. PATENT DOCUMENTS

| 895,946 A | * | 8/1908 | Biavati | ................. | B65G 9/002 |
| | | | | | 104/129 |
| 922,888 A | * | 5/1909 | Grunwaldt | ............. | A01G 31/02 |
| | | | | | 47/14 |

(Continued)

FOREIGN PATENT DOCUMENTS

CN    201667861 U    12/2010
WO    2009/133219 A1    11/2009
(Continued)

OTHER PUBLICATIONS

International Search Report, dated May 4, 2017, for Application No. PCT/ES2016/070602.

*Primary Examiner* — Joshua D Huson
*Assistant Examiner* — Megan J Moroney
(74) *Attorney, Agent, or Firm* — LADAS & PARRY LLP; Malcolm J. MacDonald, Esq.

(57) ABSTRACT

A tank housing a vertical farm, having inside a plurality of structures at different heights that are supported on the tank wall such that they create ring-shaped projections on which to place the trays for the crops and the remaining installations and channels, wherein, since the structures are arranged as rings, a hollow space is created in the central shaft of the tank that is used to install a liftable platform so that an operator or robot may access the different trays holding the vegetables, and wherein on the lower portion of the tank are located closed and sealed compartments intended for the hydraulic, electric and electronic systems for controlling the parameters necessary for crop optimisation.

13 Claims, 5 Drawing Sheets

(51) Int. Cl.
*A01G 7/04* (2006.01)
*A01G 9/14* (2006.01)
*A01G 9/26* (2006.01)

(56) References Cited

U.S. PATENT DOCUMENTS

| | | | | |
|---|---|---|---|---|
| 2,012,180 | A * | 8/1935 | Beck | A01G 31/06 47/DIG. 9 |
| 4,583,321 | A * | 4/1986 | Stanhope | A01G 7/00 47/58.1 R |
| 5,101,593 | A * | 4/1992 | Bhatt | A01G 9/16 47/17 |
| 6,076,621 | A * | 6/2000 | Horn | B62D 51/00 180/19.2 |
| 6,367,581 | B1 * | 4/2002 | Marler | B66B 11/0226 181/295 |
| 8,234,812 | B1 | 8/2012 | Colless et al. | |
| 8,533,933 | B2 | 9/2013 | Verrier | |
| 8,910,419 | B1 * | 12/2014 | Oberst | A01G 31/06 47/60 |
| 9,010,022 | B2 * | 4/2015 | Brusatore | A01G 31/06 47/83 |
| 9,592,759 | B1 * | 3/2017 | Theobald | B66B 11/0226 181/295 |
| 9,693,508 | B2 * | 7/2017 | Marchildon | B66B 11/0226 181/295 |
| 10,334,796 | B2 * | 7/2019 | Speidell | A01G 31/06 |
| 2008/0236036 | A1 | 10/2008 | Feuz | |
| 2013/0104453 | A1 | 5/2013 | Hassle | |
| 2014/0020292 | A1 | 1/2014 | McNamara et al. | |
| 2014/0115958 | A1 * | 5/2014 | Helene | A01G 31/06 47/17 |
| 2014/0196363 | A1 | 7/2014 | Chung | |
| 2015/0282437 | A1 * | 10/2015 | Ohara | A01G 7/045 47/66.6 |
| 2016/0007545 | A1 | 1/2016 | Yen et al. | |
| 2016/0212946 | A1 * | 7/2016 | Higgins | A01G 31/02 |
| 2016/0221812 | A1 * | 8/2016 | Puszkiewicz | B66F 17/006 |

FOREIGN PATENT DOCUMENTS

| | | |
|---|---|---|
| WO | 2013063739 A1 | 5/2013 |
| WO | 2014066844 A2 | 5/2014 |
| WO | 2015027267 A1 | 3/2015 |
| WO | 2016061637 A1 | 4/2016 |

* cited by examiner

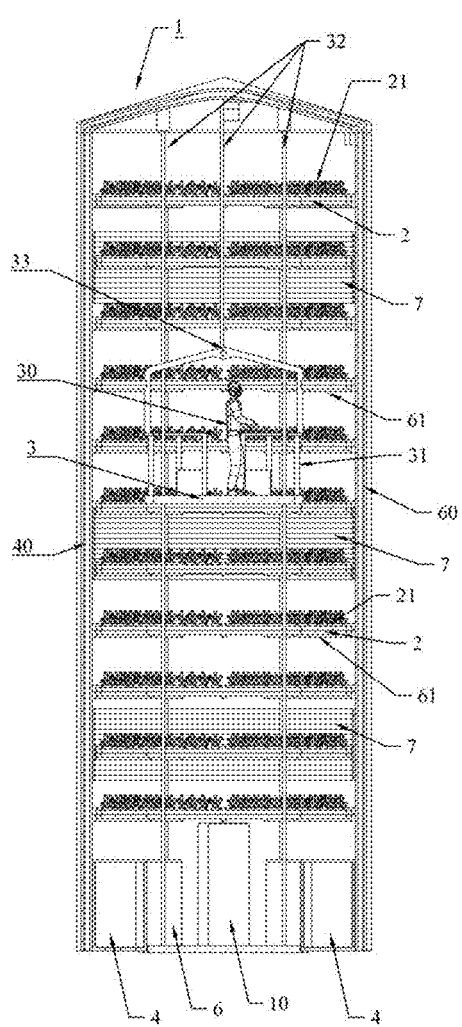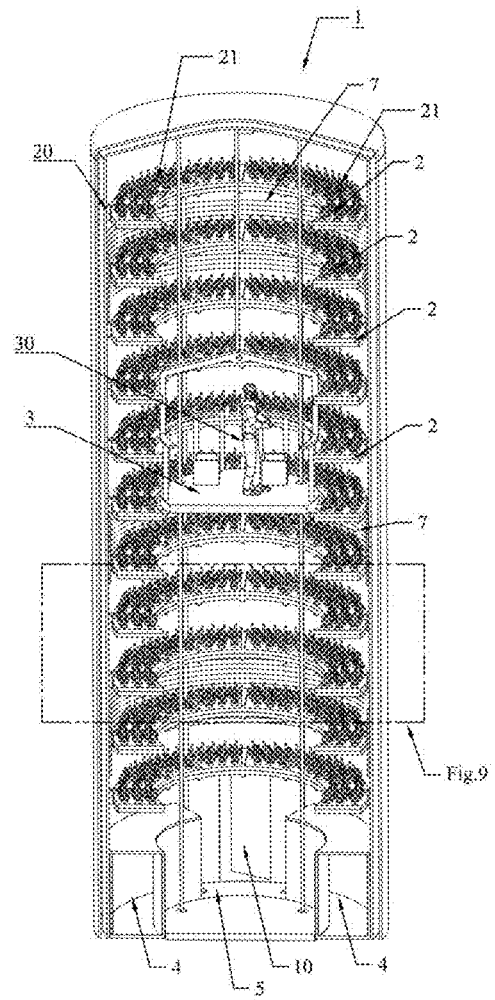

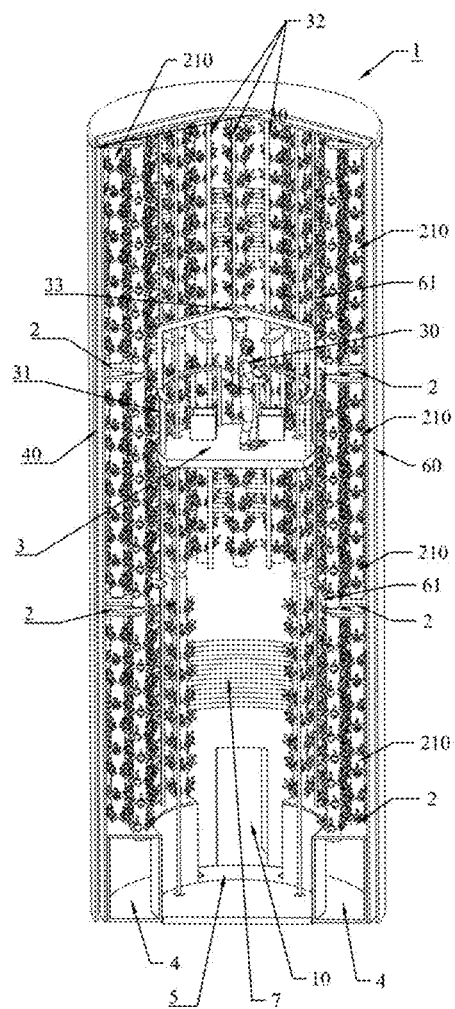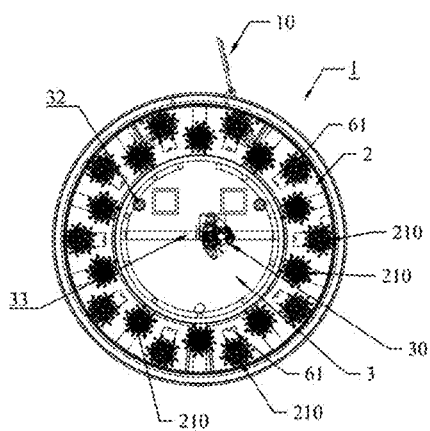

TANK HOUSING A VERTICAL FARM

OBJECT OF THE INVENTION

The present specification defines a tank that enables a vertical farm to be housed such that a space is constituted that includes a hydraulic and electric system suitable for this crop technology, that enables the installation of support structures for the crop trays at different heights, and wherein the separation height of the crop trays can in turn be adjusted, and wherein the tank, as it has a circular configuration, has a round and liftable work platform that enables any tray to be reached regardless of the height at which it is located, and that, as the tank has a cylindrical configuration, it optimises the crop growing surface and also provides a versatile and transportable solution.

The field of application of the invention is the agricultural sector in general, and specifically it falls within the technology that develops the new type of cultivation known as vertical farms.

BACKGROUND

The concept of vertical farms is a concept and a technology that has appeared in recent years, specifically at the end of the 20th century, and is based on an agricultural concept for cultivating plants inside buildings with several floors, skyscrapers or closed spaces in general, which would function as large-scale greenhouses. These spaces are high-tech installations where farmers cultivate plants on stacked structures, using hydroponic and/or aeroponic techniques, and where all the variables of the crop are controlled in detail, such as light, temperature, moisture, water and nutrients.

This new technology concept has several advantages compared to open-air crops or crops in greenhouses given that, by avoiding all the problems derived from inclement weather, and having control over different variables of the crop, in addition to the direct advantages and comfort for the farmer, this technology enables much higher production yields to be obtained and also enables work to continue every day of the year and the number of yearly harvests can even be controlled.

As this is a developing technology, there is currently a tendency to use products that can be grown with high density planting, which requires relatively low light intensity, which have short growth periods, and therefore, this technology is already used in crops such as green leafy vegetables, lettuce, broccoli and the like.

As discussed above, this technology is being developed and in general requires buildings or storage-type rooms that are thermally well insulated and almost sealed; with structural systems at different heights with a minimum separation of 400 mm between levels, and equipped with LED lighting; at least one hydraulic system with nutrient preparation; a $CO_2$ supply system to improve plant photosynthesis; equipment to provide cold/heat, moisture control, and ventilation that enables the full control of the environmental conditions required for the crop; and in general, an electronic unit for environmental control and pH and conductivity indicators.

In this regard, and as discussed above, there are registrations related to this technology, such as the registration CN201667861 that defines a movable carriage prepared for the installation of different height trays as a vertical farm; the registration U.S. Pat. No. 8,533,933 held by Glen James Pettibone that defines a mobile belt that forms or creates a cell-shaped structure or container that enables cultivation by way of a vertical farm; the registration WO2013063739 held by Hsiao-An Chang that defines a modular construction wherein crops are located in the side walls thereof and which is based on vertical farm technology and said modules being stackable on each other or configurable within a diaphanous space; or registrations that are closer to the idea of the present invention, such as for example registration WO2015027267 held by Fodder Solutions that defines a crop system and method of the vertical farm type wherein said crop is located inside a diaphanous building forming different passages, and wherein the facility is prepared to enable said planting methodology, and wherein it has means for generating clean energy, among others; the registration US20130255146 held by Filene Lori Lehman which defines a sealed area inside of which are located modular structures for planting, wherein said structures form passages or groupings, and wherein the area is also prepared for the crop according to the vertical farm technology; the registration WO2016061637 held by Fooder Solutions Holdings that defines a large room inside of which are located a plurality of structures, creating passages, and wherein the room is prepared for the planting according to the methodology of a vertical farm, and wherein there are certain particular features such as the fact that the position of the trays has a certain tilt favouring the growth of certain plant varieties.

However, and taking into account that the earlier registrations are related to the present invention, a number of registrations are detailed below that can be considered as the closest in the state of the art given that they define solutions in which the compartment is a transport container prepared to house a vertical farm. Firstly, the U.S. Pat. No. 8,234,812 held by Terry Colless is cited wherein it defines a transport unit, by way of a container, which is prepared to house therein a vertical garden and which, among others, has a continuous water and electricity supply from the outside, and which houses inside a plurality of shelves or stackable structures forming passages where the crops are housed; and it is also considered necessary to cite the registration WO2014066844 held by Greentech Agro which defines a transport container that internally houses a series of structures and supply means intended for planting according to the methodology of vertical farms, and wherein passages are created inside, additionally defining a controllable cultivation process. These last registration examples that belong to the state of the art, while still keeping the initially discussed common characteristics, have the novelty of enabling cultivation in smaller spaces and enable the possibility of having a versatile and transportable storage location, and therefore enable them to be located almost anywhere in the world without having to build a building, house, warehouse, shed or similar to house the vertical farm. However, and taking into account this advantage introduced by these transport containers prepared to enable vertical farms to be housed, the present invention introduces a new type of space to house said vertical farms, and it also has a solution that is versatile and independent that can also be installed anywhere in the world, said type of space being a cylindrical tank.

The tank housing a vertical farm, and which is the object of the present invention, has advantages compared to the buildings, houses, sheds or fixed rooms based on the fact that the tank can be considered a transportable building, which is easy to install, can be disassembled, and takes up very little land space, enabling it to be installed or located as close as possible to the centres of consumption. As these are small spaces, tank arrays can be placed, enabling specialisation by crop type, increasing the yield by work specialisation, and enabling adaptation to the storage, packaging and transport installations.

However, it also has clear advantages compared to the registrations that define transport containers prepared for this crop type and having a square or rectangular configuration, which include having a circular cross section which enables it to better resist certain external natural actions such as the wind, enables spaces to be created with very high heights, for example 15 to 22 metres, which is equivalent to a building with many floors and which is not possible with containers, and these tanks enable outer diameters of around 4100 mm which are suitable for long-distance transport and which, along with the height, enable very high and more optimised cultivable surfaces than in containers; moreover, the inner volume or space is further optimised by the corners and low ceilings being removed, and the tanks are also generally manufactured with rustproof materials, aluminium or painted carbon steel, which compared to containers manufactured with less treated metals and brick, cement or prefabricated buildings, provides them with a greater level of cleanliness and hygiene, greater resistance to corrosion and longer useful life due to moisture, a simple installation of inner equipment, support structures, pipes and even the installation of a lift; it enables insulation with different types of insulators and veneers, it enables the installation of cheap heat exchangers, commonly known as sleeves, to help control the inner temperature, and is not a breathable surface, having minimal surface roughness, and which does not create moisture or mould that may contaminate the inner compartments.

Lastly, it must be noted that the development of a tank housing vertical farms is a unique product, which along with transport containers, enables mass manufacture and cost reductions through economies of scale, minimises environmental impact as it requires less land, which lowers investment, enables it to be integrated into yards, industrial estates and areas with adverse terrain, it is transportable and installable in climatic zones that are not suitable for cultivation and can be disassembled.

As such, taking into account the registrations and the current technologies in the state of the art of this sector, there is no doubt that disclosing the present invention constitutes a solution that differs from any type of diaphanous space, compartment, container or prefabricated element in general that can be prepared to house vertical farms, and therefore introduce into this industrial sector an innovative solution that is completely different to those currently existing and which has many advantages.

DESCRIPTION OF THE INVENTION

The present invention describes a tank that enables a vertical farm to be housed, that is, the tank is a high-tech installation where plants are cultivated on structures at different heights and optimised watering techniques with a detailed water and nutrient supply are used, and wherein all the variables of the crop, such as light, temperature or moisture, are controlled.

The tank object of the present invention is a tank that can be considered as tanks of the type, that is, a closed space with an outer visual cylindrical configuration, wherein the lower surface is flat, while the upper closure thereof may be conical, rounded or curved. In any case, externally, this tank only requires one entrance door given that the rest of the components and installations are integrated inside the same.

Furthermore, a vertical farm is based on the idea of optimising the cultivation space by installing height-stackable structures. This aspect, which has been noted in the prior art present in square buildings or closed spaces, cannot be carried out in these earlier manners and arrangements in the inner space created in a tank. It is for this reason that there arises the solution of installing structures supported on the flat inner walls of the tank, which can be flat, such that ring-shaped platforms are created, which can have a front lid where to place both the trays for the crops and the electrical and lighting installations for the crops, as well as for the hydraulic and watering installations, and the remaining sensors.

Therefore, the structures at different heights that are inside the tank are formed by profiler profiles joined to the wall of the tank by welding or screws, which serve as height-adjustable supports for a plurality of projecting radial metal arms serving to hold the electric and hydraulic equipment and crop trays. In this way the separation height of the crop trays can be adjusted, which, although it can be estimated at a minimum of 40 cm, will depend on the plant variety to be cultivated. In addition, it is a cheap system that is easy to install and quick to assemble or disassemble.

As mentioned above, at the end of the inside of the tank there is a plurality of structures that, in a plan view, have a preferably annular or ring configuration, therefore leaving the central shaft of the tank free. This hollow in the shaft of the tank is used to install a liftable work platform, with a work surface that is sufficient for the operator to perform the necessary cultivation or maintenance work, given that the operator can easily reach the entire cultivation surface or the walls of the tank, and wherein even a programmed robot with a robotic arm can be installed which carries out the work without requiring human labour. This platform, which can be round or circular, is lifted through said hollow created by the structures, and for safety reasons will have a perimeter safety rail, a central light or lamp which enables the operator to carry out the work in the necessary conditions, and wherein the electric system and lifting motors are located in the ground for maintenance and safety reasons. Lastly, it must be noted that said platform is controlled by the operator.

In this regard, and once it has been shown that the liftable platform has the installations and electrical and mechanical systems thereof in the lower portion of the tank, it must be noted that the lower portion of the tank has areas for systems, storage and control of the entire tank. As discussed, the tank has an access door, which communicates with a vestibule before the access to the platform for changing specific work clothes, decontamination, controlling insect plagues and safety for access to the platform. In this vestibule there are storage or changing areas where the operator can have the inner safety elements, emergency ladders, safety harness, IP66 protection, oxygen control for work in confined spaces. Next to this vestibule there are hydraulic tanks for the supply of water and nutrient products, likewise on top of these and in order to eliminate filtering problems, there are compartments for storing the electric supply and electronic control systems for the parameters necessary to optimise the crop, such as temperature, $CO_2$, moisture, light and the like. All these rooms that are located in the lower portion of the tank are closed, sealed and covered to also prevent leaks, inlet of water or others from the crop trays.

Specifically, the hydraulic and nutrient supply system must be defined, which has, as mentioned above, a tank in the compartmented lower portion, with a stirrer, which serves to prepare the nutrients, pump the liquid, receive the return and collect the liquid when the trays are emptied. The hydraulic supply of the different structures located at different heights from the lower tank is carried out by means of pipes integrated in a single conduit support that is located vertically on the side wall of the tank, such that each structure has a specific provision and collection branch. Therefore, in connection with the hydraulic system, a portion of the electronic control system must be defined, which is also integrated in the lower portion of the tank, with which readings and values of the control of pH, conductivity and nutrient dosages are obtained in order to maintain the optimal solution, and also control the oxygenation.

Therefore, in order to control the temperature and environmental conditions controlled by an electronic system, there is an isothermal, insulated and veneered compartment in the lower portion of the tank, which has water tanks for the heat/cold accumulator for the cold/heat air conditioning system, an independent electronic controller to maintain optimal environmental conditions, a series of fans strategically located such that, due to the great height and small cross section of the tank, they create convection currents inside the tank, and in order to also control the temperature of the tank, heat exchangers, commonly known as sleeves, can be installed on the inner surface of the wall of the tank, which can also be connected to the water tanks for the heat/cold accumulator. In this area, there are also areas prepared so that different actions of the global system can be electronically automated, there can even be hardware located in this area that enables remote control with offices that using the appropriate software enable the control for monitoring, tracking, production and control of energy of the tank and the crops thereof.

The electric and lighting system of the tank is also in connection with these hydraulic and control systems of the conditions of the tank. The electric power supply of the tank assembly is also carried out from the lower portion in another compartmented and insulated compartment. This compartment can have an electric connection or power supply to the outside, and has its own energy accumulators or generation and storage means that provide said energy to the rest of the tank. Moreover, there is a general light supply through cabling that vertically travels the height of the tank, and that in each structure has a branch. Each branch powers the LED lighting bars that are arranged in 1 or 2 circuits on the centre of the structure focusing directly on the crops located in the trays. In turn, this branch enables the installation of all kinds of sensors that can control any parameter necessary to have correct and optimal values for cultivation. Another important aspect, and which has previously been mentioned, is that work lighting for the operator is above the liftable platform, which entails a lower consumption in service lighting than having lighting throughout the tank.

It must be established that the crop trays are generally configured into circular sectors that enable easy handling and are adapted to the dimensions and also circular and annular shape of the platform, they are stackable and also have quick connectors for connection to the power supply pipes.

Lastly, the present invention incorporates the possibility that other hydroponic systems, such as NFT system or nutrient film technique, or other aeroponic techniques could be comprised in the tank. Specifically, for these other recirculating systems, the horizontal trays are substituted by trays with a tubular configuration or fixed or rotating vertical tubes. The plants are placed in the sides of the plastic tube and the nutrient solution is introduced through the upper portion, wets the roots and is collected in the lower portion. These tubes can be rotated on their own axis and are based on the fact that the liquid is introduced through the upper portion and is collected through the lower portion. For this type, the lighting is arranged vertically and provides light over the plants placed in the tubes and over the wall of the tank. Lastly, the inner wall of the tank and the inner face of the lid of the platforms can be made from stainless steel with mirror sheen or reflective quality, which enables the light that reaches the wall between the hollows of the tubes to be reflected and impact again on the plants, making the most of the light intensity on all sides of the vertical tube.

To complete the description provided herein, and for the purpose of helping to make the characteristics of the invention more readily understandable, said description is accompanied by a set of drawings constituting an integral part of the same, which by way of illustration and not limitation represents the following:

FIG. 6 is a longitudinal cross-sectional representation of a tank housing a vertical farm that has sleeves on the inner walls thereof.

FIG. 7 is a perspective representation of the inside of a tank housing a vertical farm that has sleeves on the inner walls thereof.

FIG. 10 is a perspective representation of the inside of a tank housing a vertical farm with a recirculating system.

FIG. 11 is a transverse cross-sectional representation at an average height of the previous figure.

DESCRIPTION OF THE DRAWINGS AND A PREFERRED EMBODIMENT

Figure 1:
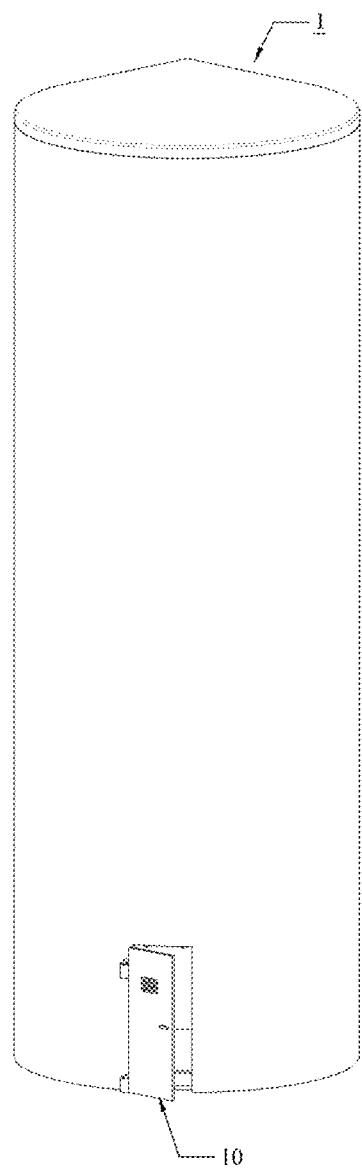
FIG. 1 is a perspective representation of the tank housing a vertical farm.

The tank object of the present invention, as can be seen in FIG. 1, is a tank (1) that can be considered as tanks of the type, that is, a closed space with an outer visual cylindrical configuration, wherein the inner surface is flat, while the upper closure thereof may be conical, rounded or curved, and which has one entrance door (10) given that the rest of the components and installations are located inside the same.

Figure 2:
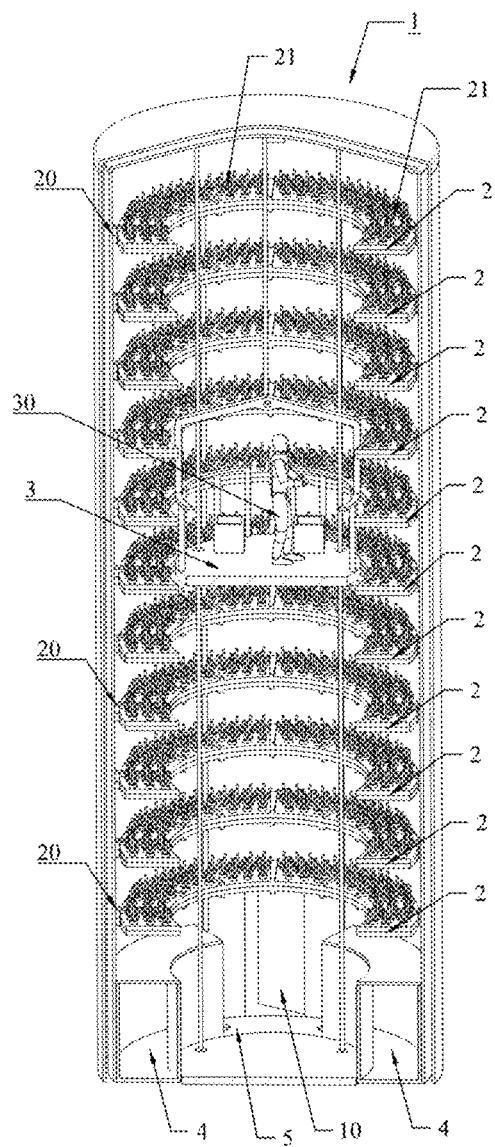
FIG. 2 is a perspective representation of the inside of the tank housing a vertical farm.

Furthermore, as can be seen in FIG. 2, in order to optimise the vertical farm concept, inside the tank (1) which has flat walls, structures (2) are installed that are supported on the inner wall by supports (20) of the tank such that they create ring-shaped projections on which to place the trays (21) for the crops and the remaining necessary installations. Moreover, it can be seen how these ring-shaped structures (2) generate a hollow space in the central shaft of the tank (1) that is used to install a liftable platform (3) so that at least one operator (30) or, if applicable, a robot with a robotic arm may access the different trays (21) holding the vegetables. Lastly, this figure shows that located in the lower portion of the tank (1) there are areas intended for the installations, electrical and mechanical systems in the lower portion of the tank; it must be noted that the lower portion of the tank has areas for systems, storage and control of the entire tank. As can be seen, once the tank (1) has been entered into through the door (10), a vestibule (5) is accessed that is before the access to the platform (3) and that has storage areas. Next to this vestibule (5) there are hydraulic tanks (4) for the supply of water and nutrient products, likewise on top of these and in order to eliminate filtering problems, there are compartments for storing the electric supply and electronic control systems for the parameters necessary to optimise the crop (not shown). All these rooms, although not shown in the figure, are closed, sealed and covered to also prevent leaks, inlet of water or others from the crop trays (21). In this regard, an embodiment of the tank constitutes a compartment with a height of between 15 to 22 metres, with an outer diameter of 4100 mm, this dimension being designed for long-distance transport, with a separation between structures of a minimum of 40 cm and that therefore creates a net cultivable surface of between 200 and 300 m$^2$, meaning only 25 m$^2$ of outer surface of the ground is required to place the tank. The width of the supports and the trays is comprised between 0.75 and 0.90 m wide, therefore it enables the liftable platform to be approximately 2.25 m in diameter, about 4 m$^2$, which is a much larger work surface with respect to the platforms necessary in the passages created in the containers or rooms with a rectangular configuration.

Figure 3:
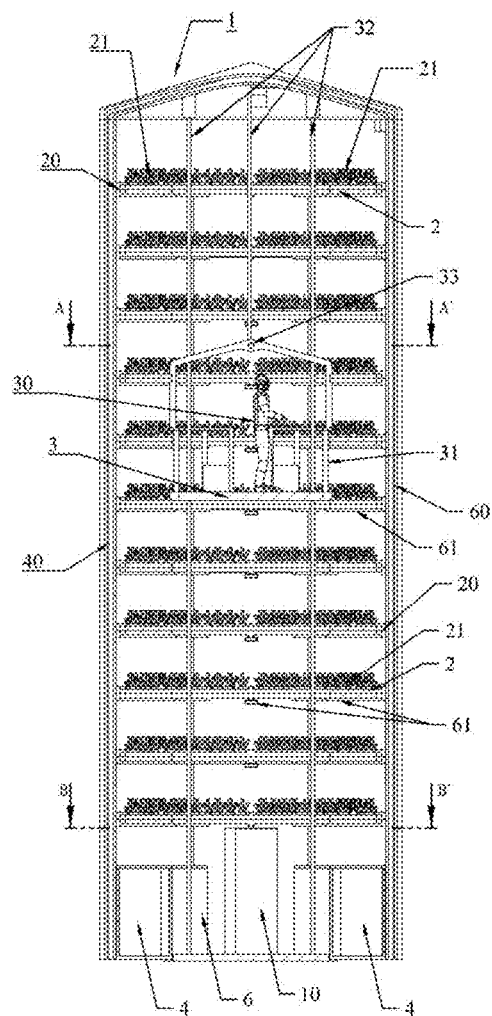
FIG. 3 is a longitudinal cross-sectional representation of the tank housing a vertical farm.
Figure 4:
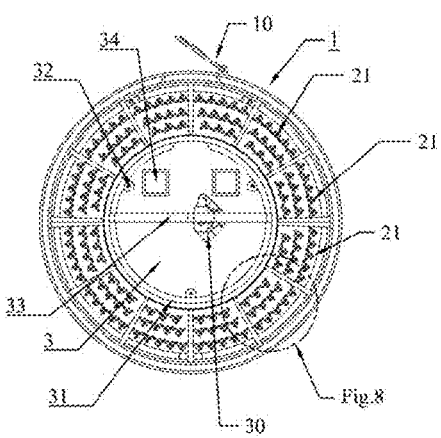
FIG. 4 is an A-A' transverse cross-sectional representation according to the previous figure.
Figure 5:
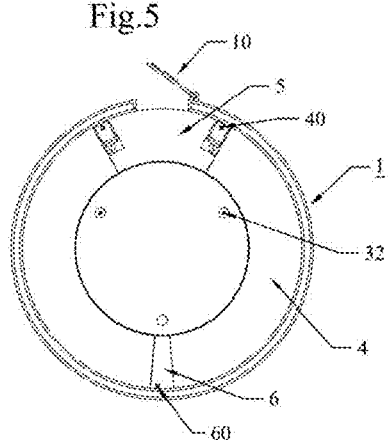
FIG. 5 is an B-B' transverse cross-sectional representation according to FIG. 3.

FIGS. 3 to 5 show that the elements that form the inside of the tank (1) coincide with those of FIG. 2; however, they are described in greater detail. In this regard, two cross sections A-A' (FIG. 4) and B-B' (FIG. 5) are made in order to better see those details. The structures (2) are formed by a profile joined to the wall of the tank by a support (20) fastened by welding or screws, which serve as height-adjustable supports for a plurality of projecting radial metal arms or profiles that form said structure (2) and serving to hold the electric and hydraulic equipment and crop trays (21). A round and liftable work platform (3) is installed in the hollow of the shaft of the tank (1) created by the ring configuration of the structures (2), where the operator (30) can perform the necessary cultivation or maintenance work and place boxes (34) or what may be required. This platform (3), for safety reasons, has a perimeter rail (31), a central light (33) or lamp which enables the operator to carry out the work in the necessary conditions, and wherein the electric system and lifting motors are located in the ground for maintenance and safety reasons, but which have vertical guides (32) that fasten to and enable the upwards and downwards movement of said platform (3).

Additionally, FIGS. 3 to 5 show that there are areas for systems, storage and control of the entire tank in the lower portion of the tank (1). The tank (1) has one access door (10), which communicates with a vestibule (5) before the access to the platform (3) for changing specific work clothes, decontamination, controlling insect plagues and safety for access to the platform. Next to this vestibule (5) there are hydraulic tanks (4) for the supply of water and nutrient products, from which originates the hydraulic supply duct (40) of the different structures (2) located at different heights, such that each structure (2) has a specific provision and collection branch for said hydraulic circulation. Similarly, there is a space or compartment (6) intended for the electric and electronic systems, which can have an electric connection or supply to the outside, and has its own energy accumulators or generation and storage means that provide said energy to the rest of the tank, similarly originating from the same is the general light power supply (60) through cabling that vertically travels the height of the tank, and that in each structure (2) has a branch. Each branch powers the LED lighting bars (61) that are arranged in 1 or 2 circuits on the centre of the structures focusing directly on the crops located in the trays (21). FIG. 5 represents a possible solution, but these compartments and rooms can be designed in multiple shapes provided that the fact that they are closed, sealed and protected is respected.

FIGS. 6 and 7 show a tank (1), which keeping the same characteristics and elements of those defined above, that is, it is made up of a plurality of structures (2) supported on the inner wall by supports (20) where both the trays (21) for the crops and the remaining necessary installations and conduits are placed, which has a liftable platform (3) for an operator (30), and wherein in the lower portion of the tank (1) are located areas intended for installations, electrical and mechanical systems in the lower portion of the tank; it must be noted that the lower portion of the tank has areas for systems, storage and control of the entire tank, such as the vestibule (5), the hydraulic tanks (4) and the compartments that protect the electric and electronic components (6), these two figures incorporate the possibility of also controlling the temperature of the tank by means of the installation of thermal exchangers, or commonly known as sleeves (7), on the inner surface of the wall of the tank (1).

Figure 8:
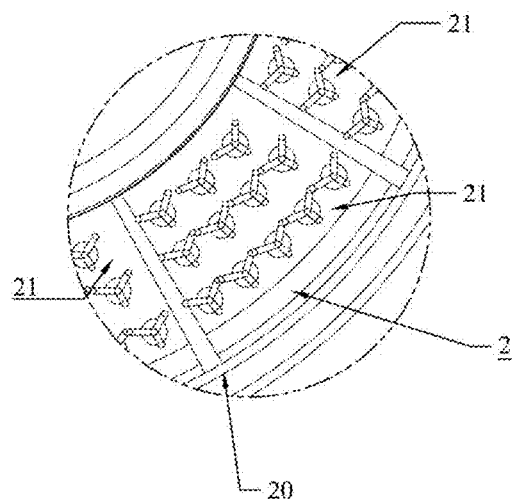
FIG. 8 is a detailed plan representation of the structures intended for the crops.
Figure 9:
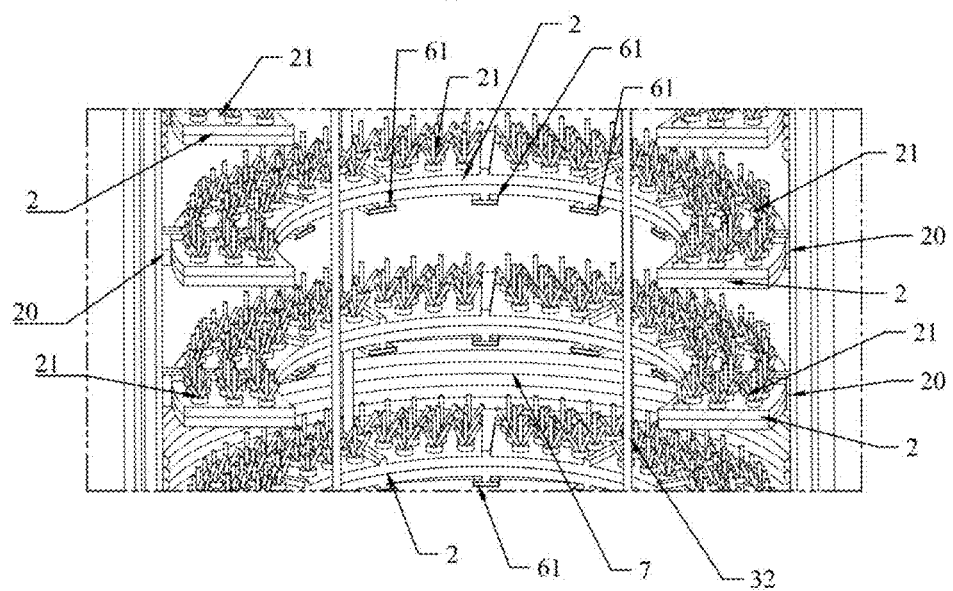
FIG. 9 is a detailed perspective representation of the structures intended for the crops.

Another important aspect that must be defined are the crop trays (21), as may be seen in FIGS. 8 and 9, which are provided in greater detail in FIGS. 4 and 7, that are configured in circular sectors that enable easy handling and are adapted to the dimensions and also circular and annular shape of the structure (2). Furthermore, it can be seen how the structures (2) are profiles that house conduits enabling the connection with the general hydraulic (40) and electric (60) supply ducts, therefore, the structures support and hydraulically supply the trays (21) through the upper portion thereof, while the lower portion supports the LED lamps (61) that light the trays (21) of the lower structure (2).

Lastly, FIGS. 10 and 11 show the tank (1), which keeping the same characteristics and elements of those defined above such as the vestibule (5), the hydraulic tanks (4) and the compartments that protect the electric and electronic components (6) are in the lower portion of the tank or the inclusion of the sleeves (7); the tank (1) enables the installation of a hydroponic system, such as the NFT system or Nutrient Film Technique, wherein the trays (210) located on the different supports (20) have a vertical tubular configuration, therefore the nutrient solution or liquid from the hydraulic supply duct (40) is introduced through the upper portion, wets the roots and is collected in the lower portion. It must be noted that in this case, the LED lamps (61) powered by the general duct (60) are arranged vertically. Similarly, a round and liftable work platform (3) is installed in the hollow of the shaft of the tank (1) created by the ring configuration of the structures (2), where the operator (30) can perform the necessary cultivation or maintenance work and place boxes (34) or what may be required. This platform (3), for safety reasons, has a perimeter rail (31), a central light (33) or lamp which enables the operator to carry out the work in the necessary conditions, and wherein the electric system and lifting motors are located in the ground for maintenance and safety reasons, but which have vertical guides (32) that fasten to and enable the upwards and downwards movement of said platform (3).

Having sufficiently described the nature of the invention above, taking into account that the terminology that has been used in this specification should be taken in a broad and non-limiting sense, as well as the description of the best mode of carrying it out in practice, it is requested that the patent be registered, as it has been proven that it constitutes a positive technical advancement, the essence of said invention being what is specified below in the following claims.

The invention claimed is:

1. A tank housing a vertical farm, comprising:
a cylindrical tank having a vertical inner wall that defines an inner space;
a plurality of ring-shaped structures fastened to the inner wall of the tank using a support;
wherein the plurality of ring-shaped structures defines a central well;
a height-adjustable platform disposed in the central well;
trays of crops disposed on the plurality of ring-shaped structures;
structures that house electric conduits that power LED lamps and house hydraulic conduits that supply said trays;
a sealed and closed compartment for electrical and electronic control systems for controlling the optimal parameters of the crop, and from which also originates an electrical supply duct; and
a lower portion of the tank comprises a vestibule located before an access to the platform, the vestibule being accessed through a door;
hydraulic tanks located proximate to the vestibule, the hydraulic tanks supplying water and nutrient products to the trays of crops;
a general hydraulic supply duct connected to the hydraulic tanks;
wherein the plurality of ring-shaped structures support, in the upper portion thereof, the trays of crops, and, in the lower portion thereof, fasten the LED lamps which are arranged in circuits on the center of said plurality of ring-shaped structures, focusing directly on the crops located in a lower level of the trays;
wherein each of the plurality of ring-shaped structures is connected to an hydraulic connection pipe or branch connected to the general hydraulic supply duct;
wherein each of the plurality of ring-shaped structures is connected to an electric connection line or branch connected to a general electric supply duct; and
wherein the lower portion of the tank comprises an isothermal, insulated, and veneered compartment.

2. The tank housing a vertical farm according to the characteristics of claim 1, which is characterised in that each of the trays has a vertical tubular configuration (210) wherein the plants are placed in grooves in the sides of the tube and the liquid is introduced through the upper portion and is collected through the lower portion, and wherein the LED lamps (61) are arranged vertically.

3. The tank housing a vertical farm according to claim 1, wherein the platform has a perimeter safety rail, a central light, or lamp, and has vertical guides that fasten to and enable the upwards and downwards movement of said platform.

4. The tank housing a vertical farm according to claim 3, wherein the platform is configured to hold an operator.

5. The tank housing a vertical farm according to claim 3, wherein the platform is configured to hold a robot.

6. The tank housing a vertical farm according to claim 1, wherein sleeves or thermal exchangers are located on the wall of the tank.

7. The tank housing a vertical farm according to claim 1, wherein, in the sealed and closed compartment, there is a hardware and a software that enables the remote control of the monitoring, tracking, and production of the tank and the crops thereof.

8. The tank housing a vertical farm according to claim 1, wherein the compartment has an electric connection or supply to the outside.

9. The tank housing a vertical farm according to claim 1, wherein the compartment has energy accumulators, or generation and storage means.

10. The tank housing a vertical farm according to claim 1, comprising sensors distributed throughout the entire tank that measure the optimal parameters of the crop.

11. The tank housing a vertical farm according to claim 1, wherein the plurality of ring-shaped structures are height-adjustable in the tank.

12. The tank housing a vertical farm according to claim 1, wherein the plurality of ring-shaped structures are supported on the inner wall by supports.

13. The tank housing a vertical farm according to claim 1, wherein the plurality of ring-shaped structures are in a fixed position on the inner wall.

* * * * *